April 12, 1932. H. L. GENTRY ET AL 1,853,411
PIPE JOINTURE
Filed April 14, 1930 2 Sheets-Sheet 1
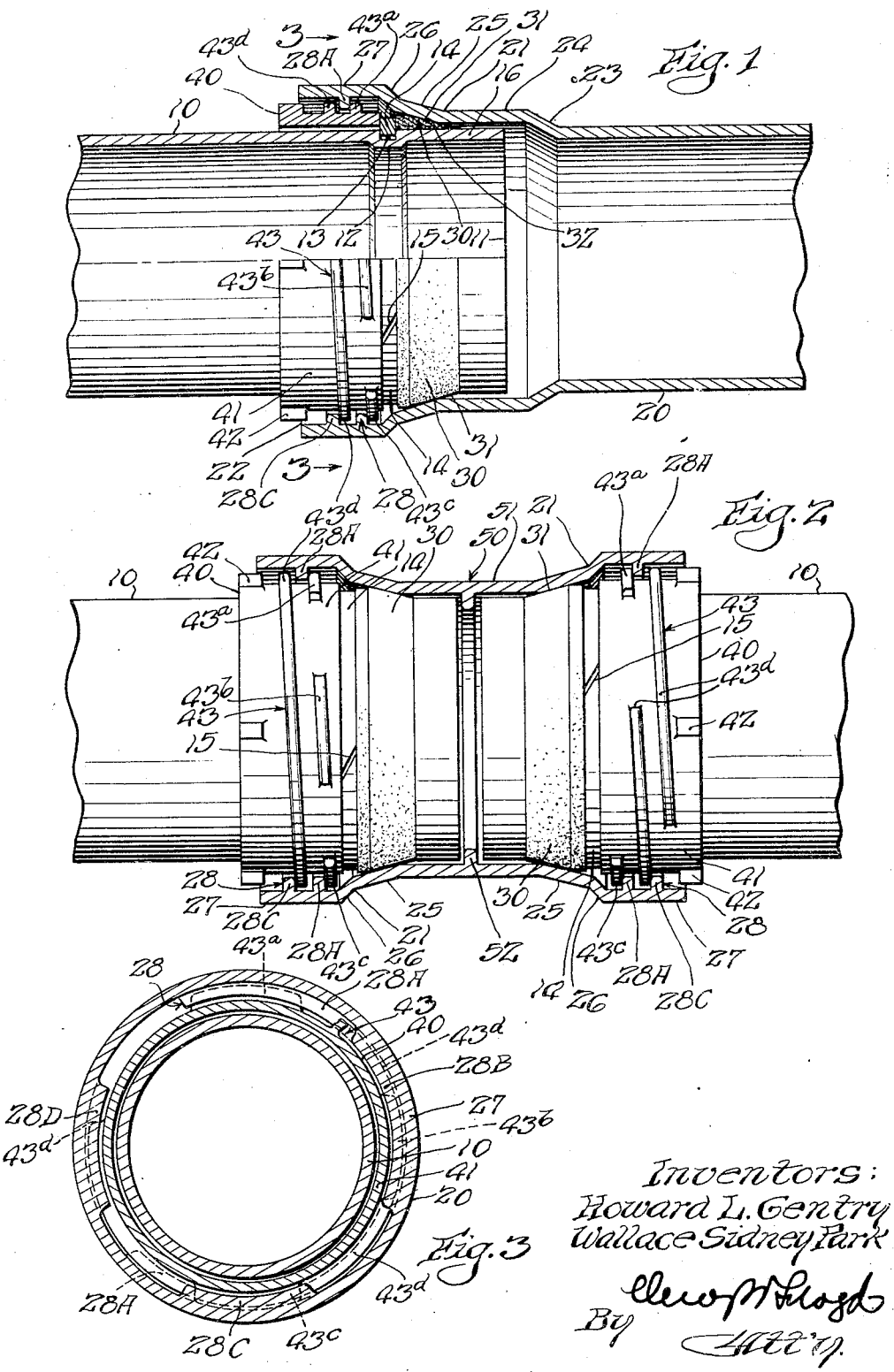
Inventors:
Howard L. Gentry
Wallace Sidney Park

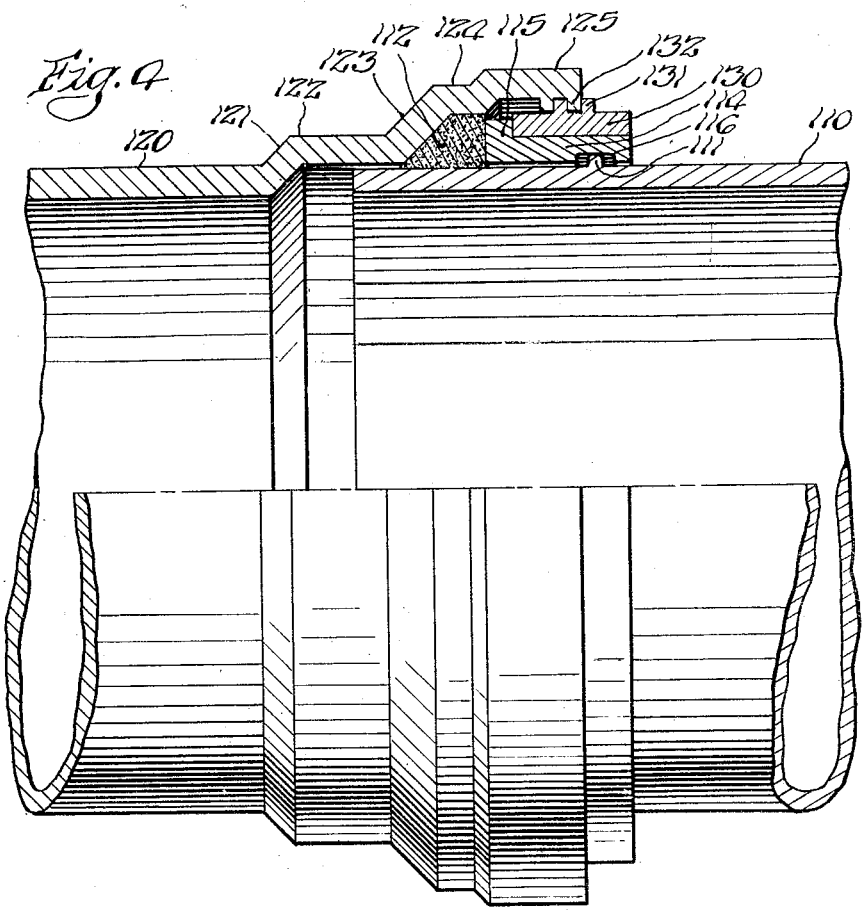
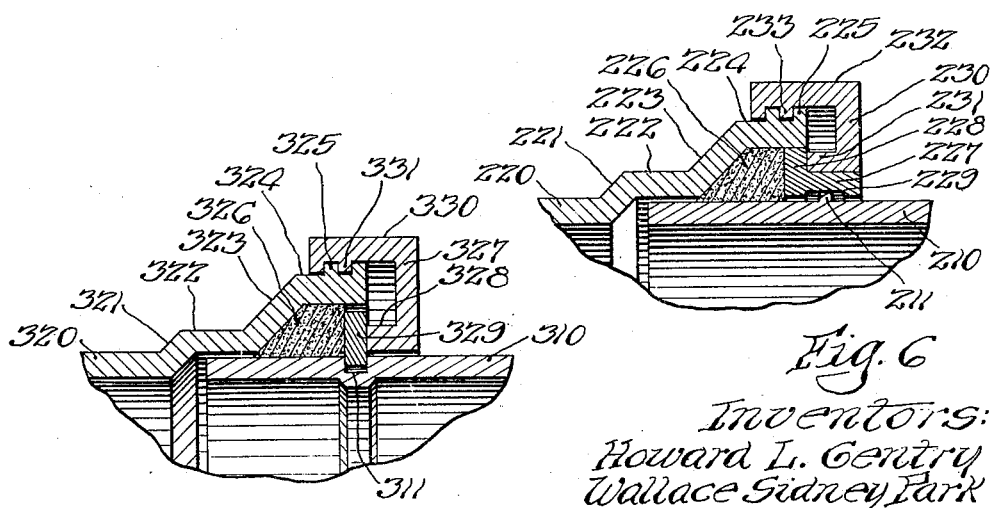

Patented Apr. 12, 1932

1,853,411

UNITED STATES PATENT OFFICE

HOWARD L. GENTRY, OF BUECHEL, AND WALLACE SIDNEY PARK, OF LOUISVILLE, KENTUCKY

PIPE JOINTURE

Application filed April 14, 1930. Serial No. 444,039.

The present invention relates to couplings and the like but is applicable to pipe joining, stuffing boxes, and wherever a close fitting tube or cylinder connection is required.

The objects of the invention include, among others, the provision of new and novel means suitable for connecting pipes or for forming stuffing boxes, for other purposes; also a means to obtain a secure but flexible joint; and an improvement in the manner of joining pipes and the like one to another or to couplings.

Included also in the objects of the invention is an improved means for joining pipes, or pipes and couplings, and by which expansion and contraction does not produce leakage.

These objects, and such other objects as may hereinafter appear, are obtained by the novel structure, unique combination, and improved arrangement of the several elements forming the several embodiments of the invention herein illustrated, there being in conjunction with this description two sheets of drawings, in which Figure 1 is a fragmentary view of two pipe ends, one pipe end being partly in section and partly in plan, and the other having a bell end in section, the two being joined by the connecting means forming the subject of this application and which is in plan and partly in section;

Figure 2 is a sectional view of a pipe coupling, the pipes in association therewith and the connecting members being in plan;

Figure 3 is a transverse section on the line 3—3 of Figure 1;

Figure 4 is a combined longitudinal section and plan view of a modified form of the invention;

Figure 5 is a fragmentary section of a still further modification of the invention; and Figure 6 is another fragmentary section of a further modification, somewhat like that shown in Figure 5.

Like reference characters are used to designate similar parts in the drawings and in the description of the invention which follows.

Figures 1, 2 and 3 may be read conjointly so far as structure is concerned, the coupling of Figure 2 comprising opposed bell ends like that shown in Figure 1, the pipes being duplicates of the left hand pipe shown in Figure 1.

Reference is now had to Figure 1. At the left hand side thereof, partly in section and partly in elevation, is a pipe 10 terminating with an open end 11. In pipe 10, there may be a thickened annular portion 12 used to reinforce the pipe about a circumferential groove 13 in which may be disposed a ring or washer 14 which may be split as indicated at 15. Instead of the thickened annular portion, the pipe may be reinforced or a slot may be milled out without unduly weakening the pipe structure.

At the right hand side of Figure 1, and in section, is a second pipe with a flare or bell end, the body of the pipe being designated 20, the flare end 21, and the open mouth 22. In such flare end 21 are a plurality of sections, some truncated cones of different degrees and others annular rings, the outer of these being the main pipe flange, said sections being designated in the order named from the body 20 to the mouth 21, by the numerals 23, 24, 25, 26, and 27, such sections being generally arranged to receive the end 11 of the pipe 10, and the connecting member forming the subject matter of this application for Letters Patent.

In order to provide a joinder between the two pipes, 10 and 20, the ring or washer 14 is placed about pipe 10 in order that it may ride in groove 13. When the pipe 10 has a plain end, the washer 14 may be annular without the split 15 and it may ride upon the periphery of the pipe 10 which it should closely engage.

In the section 16 of the pipe 10 intermediate the washer 14 and in the direction of the mouth 11 of the pipe is generally disposed a flexible or compressible truncated cone-like annular washer 30, the sloping wall 31 thereof being adapted to engage the section 25 of the end of pipe 20. Said washer 30 has a cylindrical internal periphery 32 to closely hug the outer periphery of section 16 of pipe 10, and the washer may have a truly cylindrical end section 32 to abut washer 14.

The ring 14, best shown in Figure 1, if not already in position in groove 13, may now be placed in position. When the groove 13 is omitted, the washer 14 is placed on section 16 adjacent washer 30. The bell end 21 of pipe 20 at its inside and within section 27 thereof has a thread 28 extending approximately one and one half or more times around the internal face of section 27. Said thread 28 may be continuous or it may be mutilated in respect to its first or outer convolution to provide a plurality of openings between thread lugs 28B, 28C, and 28D, to receive complemental fragments of broken thread portions upon a closure ring 40 now to be described, the continuous portion of the remainder of thread 28 beginning at point 28A and extending inwardly to its end.

On said closure ring 40, which comprises the body 41, there is an outer flange 42 which is of the depth of the thread portion thereof, there being a thread 43 which with its lug portions 43a, 43b and 43c, extends approximately one and one half times about the body 40, there being between the three lugs sections 43a, 43b, and 43c, openings which admit the lugs 28B, 28C, and 28D. The continuous and outermost portion of thread 43 begins at point 43d. In pipes of larger dimensions, a greater number of lugs than three would be used as a matter of strength and convenience.

The lug threads 43a, 43b, and 43c, are complemental to the spaces between lug threads 28B, 28C and 28D, so that the closure ring, when in proper registry, is adapted to be seated deeply in pipe section 21, and in such a position that rotation a fractional turn causes an immediate interlocking of the continuous sections of the threads 28A and 43d, concurrently with the interlocking of the several lug sections 28B, 28C and 28D and 43a, 43b, and 43c.

Continued rotation results in pressure being applied upon the washer 14 which causes the pipe 10 to travel inwardly of pipe end 21 to compress flexible washer 30, expanding it to tightly close the space between the internal periphery of bell end 21 of pipe 20 and section 16 of pipe 10 to prevent leakage between pipes 10 and 20. Instant release of the pipes and removal of the sealing closure therebetween may be had by rotating the member 40 in the opposite direction until registry of the lugs of one part with the proper openings of the other is obtained. The reason for using thread lugs of different lengths and openings corresponding thereto is to require as a prerequisite to seating closure ring 40 that it be in a specific and single relation to pipe end 21 before it may be inserted thereinto. Such registry prevents attempted improper threading of said closure 40 in the bell end 21, and the immediate interlocking of the threads when such registry is attained.

When the groove 13 is omitted, the washer 14 is forced against flexible ring 30 causing the deformation of the latter to join pipes 10 and 20 securely but not preventing movement of said pipes 10 and 20 relatively due to expansion and contraction incident to changes in temperature as well as jarring incident to ground or pipe disturbances.

In Figure 2, there are two pipes 10. A coupling 50 therebetween comprises two bell ends 21 oppositely faced and joined together by a section 51 of annular configuration. At the middle of section 51 is an internal circumferential ridge or flange 52 which is disposed between the ends 11 of pipes 10. It will be noted that the pipe ends 11 normally do not attain the flange 52 but may be forced thereagainst by pressure of the closure ring 40.

Only two forms of the invention are illustrated but other forms are contemplated, and use of the device is not limited to the embodiments of pipe joinders set out, as is clearly manifest.

In Figure 4, a modified form of the invention wherein one pipe has an external locking section and the other an internal section is illustrated. In this form of the invention the pipe 120 has a bell end of sections 121, 122, 123, 124 and 125. Associated therewith is a pipe 110 having a beading 111 thereabout. Intermediate the pipes and about pipe 110 is a flexible or rubber washer 112 which is adapted to be compressed by a ring 114 having a flange 115 to engage washer 113 and an annular groove 116 in which the beading 111 is adapted to ride. Usually ring 114 is split for facilitating its attachment in pipe 110 and about beading 111.

A locking ring 130 like that previously described is adapted to ride upon the cylindrical face of the ring 114. On the member 130 are threads 131 which are adapted to engage in the threads 132 in section 125 of the pipe 120.

By the arrangement shown a highly efficient and flexible jointure is had. The construction admits of large expansion and contraction between pipes 110 and 120 without loosening the closure therebetween, the closure being constantly maintained without binding. Pipe 120 may move relatively to pipe 110 a distance substantially equal to the width of slot 116 without causing any binding upon washer 112.

In Figures 5 and 6, outside locking rings are shown. Pipe 210 has a circumferential bead 211 adjacent its end. Pipe 220 has a bell portion comprising sections 221, 222, 223 and 224. On the latter are external threads 225. A washer 226 is seated in sections 223 and 224. A split ring 227 having an end flange 228 and a circumferential slot 229 is arranged about pipe 210.

A locking ring 230 having a flange 231 engaging the end flange 228 of part 227 is also provided with an external cylindrical flange 232 having internal threads 233. The threads 233 engage the corresponding and complemental threads 225 upon section 224.

Thus a lock like that shown in Figure 4 is had in the form of device shown in Figure 5, but with the locking ring external to both pipes rather than intermediate said pipes.

Expansion and contraction is compensated for by the beading 211 on pipe 210 which is engaged by the material of ring 227 at either side of slot 229. Thus bending between the pipes 210 and 220 because of the connection therebetween is novelly avoided, and a very flexible joinder of pipe sections obtained.

In Figure 6, another form of outside locking ring is illustrated. In this form pipe 310 has a circumferential slot 311. This may be milled out and may be in relation to a reinforced part when desired. Pipe 320 has a bell portion comprising sections 321, 322, 323, and 324. On section 324 are external threads 325. Between the pipes 310 and 320, and in sections 323 and 324 is a compressible or flexible washer 326.

A locking ring 327, which for purposes of seating may be of split construction, comprises an internal flange 328 terminating in an annular ring 329, one face of which loosely rides in slot 311. Externally, member 327 comprises a cylindrical flange 330 which is concentric with flange 328.

On the internal face of flange 330 are threads 331 which are arranged to receive threads 325 on section 324 of pipe 320. In use, the member 327 is seated about pipe 310 and washer 326 seated in the bell end of pipe 320. By screwing home member 327 on the bell end of pipe 320, the member 326 is compressed to secure a tight joinder between the two pipe sections. At the same time, the pipes may expand and contract freely without binding, because of the freedom with which locking ring 327 is connected to pipe 310 by the employment of a groove 311 in the latter and in which the annular flange 329, forming an integral part of the ring 327, rides.

We claim:

1. In combination, a pipe joining means adapted to be seated in one member and surround a second and concentric member, there being in one of said members a thread divided into sections one of which is longer than half the periphery of said member, and in said closure a similar divided thread whereby to permit of concurrent registry between a plurality of thread convolutions on said closure member.

2. A pipe joining means comprising a member having a flaring end and provided with a conical seat and a helical thread, a second member adapted to be surrounded by said first member, a truncated coniform annulus in said seat and surrounding said second member, and a ring having mutilated threads at least one of which extends more than 180 degrees about said member adapted to be seated in said flaring end and deform said annulus to seal the space between said first and second members, and in which the mutilated sections of threads on said first member and ring are of irregular extent and are complemental.

3. A pipe joining means comprising a member having a flaring end and provided with a conical seat and a helical thread, a second member adapted to be surrounded by said first member, a truncated coniform annulus in said seat and surrounding said second member, and a ring having mutilated threads at least one of which extends more than 180 degrees about said member adapted to be seated in said flaring end and deform said annulus to seal the space between said first and second members, and in which the mutilated sections of threads on said first member and said ring are of different lengths and said threaded portions are complemental in one position only, and said second member has thereabout a friction member disposed intermediate said annulus and ring.

HOWARD L. GENTRY.
WALLACE SIDNEY PARK.